May 24, 1932.  A. J. JACOBS  1,860,184
REGISTERING DEVICE
Filed Dec. 21, 1928
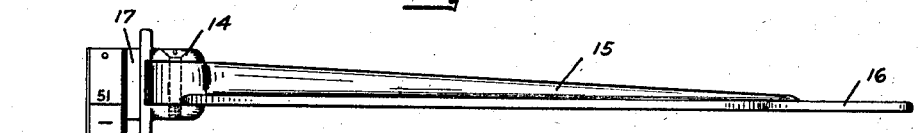
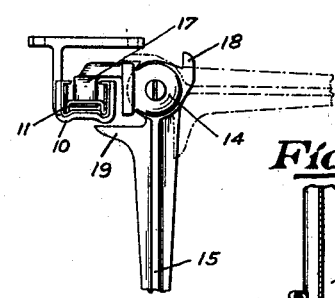
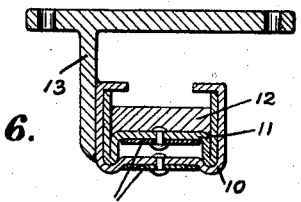
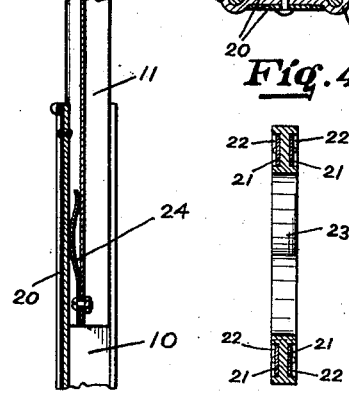
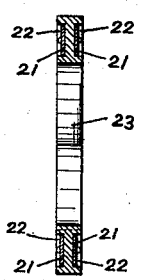
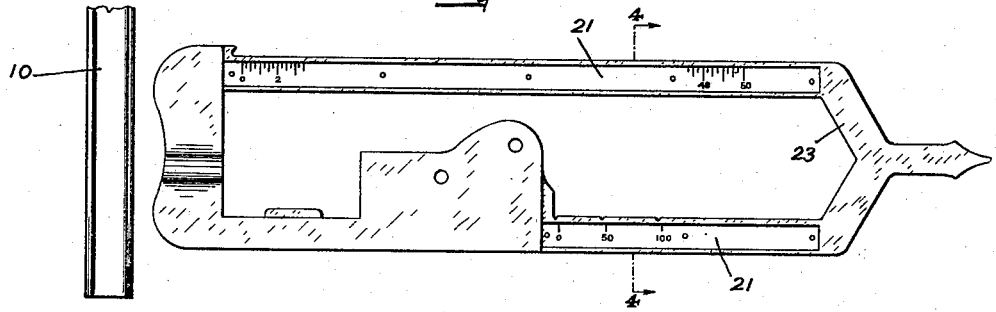
INVENTOR.
A. J. Jacobs
BY Duell, Dunn & Anderson
ATTORNEYS.

Patented May 24, 1932

1,860,184

UNITED STATES PATENT OFFICE

AARON J. JACOBS, OF BROOKLYN, NEW YORK, ASSIGNOR TO THE JACOBS BROS. CO., INC., OF BROOKLYN, NEW YORK, A CORPORATION OF NEW YORK

REGISTERING DEVICE

Application filed December 21, 1928. Serial No. 327,499.

This invention relates to a registering mechanism capable of use in numerous different associations but primarily to be employed in connection with scales.

It is an object of the invention to provide a mechanism of this character, the elements of which may be employed in connection with various scale parts or accessories, but which are primarily intended to be utilized in connection with a height-measuring device which, while capable of being independently employed, is of particular utility when associated with a scale of, for example, a platform type.

A further object of the invention is that of providing an improved height-measuring device covering a comparatively great range, and the parts of which may be adjusted readily to various positions and the indicated height being plainly registered.

Another object is that of providing such a structure, the parts of which will be few in number, readily manufactured and assembled and furnishing useful service over long periods of time with freedom from mechanical difficulty.

With these and further objects in mind reference is had to the attached sheet of drawings illustrating one practical embodiment of the invention and in which:

Figure 1 is a front view of a height-measuring device;

Fig. 2 is a plan view thereof;

Fig. 3 is an enlarged sectional view taken along the lines 3—3 in the direction of the arrows of Fig. 1;

Fig. 4 is a transverse sectional view taken along the lines 4—4 and in the direction of the arrows of Fig. 5.

Fig. 5 is a front view of a scale beam embodying the present invention, and

Fig. 6 is a sectional view showing a construction which may be adopted.

Referring primarily to Figs. 1 to 3, it will be seen that the numeral 10 indicates the base of a channel member which, as shown, is preferably U-shaped in cross-section, with its base slightly recessed and its arms bent inwardly to provide a confining portion. Slidably mounted within the space defined by this channel member is a second channel member 11 having its base recessed preferably to an even greater extent than the base of the member 10 is recessed. The body of the member 11 may be reinforced, if desired, by a strip 12 of suitable material extending longitudinally within the same and it will be observed that the inturned portions of the arms of the member 10 serve to prevent relative displacement of the member 11 with respect thereto. If desired, a bracket 13 may be secured to the member 10 so as to attach the same to a suitable supporting surface and at the upper end of the member 11 there is secured, by means of a pivot 14, an arm 15 having a head-contacting portion 16. The pivot 14 is associated with the member 11 preferably by means of a bracket arm 17 which assures a spacing of the parts of the pivot to a point at which they will clear and extend to one side of the member 10 when the parts have been telescoped to a point at which this may occur. The arm 15 may carry a stop element 18 contractible with the bracket 17 for the purpose of preventing this arm from being swung to too great an extent. The arm may additionally present a registering finger or pointer portion 19, which, when the arm is shifted forwardly to the position shown in full lines in Fig. 2, will traverse the front face of the member 10.

Disposed within the grooves provided in the outer faces of the base portions of the strips 10 and 11 by virtue of their recessing, are strips 20 which may be secured in position as, for example, by rivets. These strips present a series of graduations which may be embossed therein so that the scale of the registering device will be plainly apparent.

Likewise, as in Figs. 4 and 5, strips 21 of a similar nature are provided within the recessed side faces 22 of the scale beam 23 which may preferably be die-cast, it being understood that by this expedient a readily legible register is provided and that it will not be necessary to incur the expense of having the die embrace the indicia, with consequent liability of having certain of its indicia vague, and necessitating the destruction of the unit and re-dieing of the same, aside from the fact that by means of the present invention it is feasible to provide a greater contrast between the register and background than is otherwise feasible.

In employing the device of Figs. 1 to 3, the member 10 is, as aforestated, preferably associated with the base of a scale and the bracket 13 is secured to the scale column. Obviously, however, this need not necessarily be done, but in any event, if the member 10 is in proper relation to the surface upon which the person being measured is supported, it will be a simple matter, by simply swinging the arm 15 to a point at which the head of such person contacts with the portion 16 thereof, to observe the reading at the upper end of the member 10 and thus determine the height. If a person be of less height than the height of the member 10, the proper registration may nevertheless be accurately determined by simply swinging the arm to the position shown in full lines in Fig. 2 and thereupon observing that portion of the scale upon the strip 20 which is in registry with the finger or pointer 19. In certain instances it may be found that the tendency of the telescopic elements or channel members may tend to slide too freely with respect to each other. With this in mind and according to the present invention, a spring 24 may be associated with the inner element to bear against the inner face of the outer element which will obviously serve to retard the relative movement of these members, thus achieving the result desired.

Thus, among others, the several objects specifically aforementioned are accomplished. It will be understood, however, that numerous changes in construction and rearrangements of parts might be resorted to without departing from the spirit of the invention as defined by the claims.

Having described my invention what I claim as new, and desire to secure by Letters Patent, is:

1. A height-measuring device including a member mounted for vertically slidable movement, a scale associated with said member, an arm pivotally mounted on said member and having movement in a horizontal plane, a head contact portion forming a part of said arm, and a stop cooperating with said member and also forming part of said arm to limit the pivotal movement thereof.

2. A height-measuring device including a pair of telescopically disposed members, each U-shaped in cross-section, scales associated with the base portions of said members, a bracket extending between the arms of the outermost member and secured to the innermost member, an element carried by said bracket, and means forming a part of said element to traverse the scale graduations associated with the outermost member.

3. A measuring device including a pair of members U-shaped in cross-section and one slidably disposed within the other, means for confining said members to telescoping relationship, a plurality of strips bearing graduations and associated with said members, an object contacting device, means forming a part thereof and movable to traverse the graduations of the strip associated with said outer member, and a bracket for mounting said device, said bracket extending between the arms of said outer member and being secured to the inner face of the inner member.

4. A measuring device including, in combination, a graduated slotted outer member an inner member mounted for vertical movement within the same, an object contacting device pivotally mounted by and horizontally movable with the upper end of said inner member, an indicating pointer carried by said object contacting device adjacent its point of pivotal connection, said indicating pointer being adapted for registration for the graduations of the outer member and being disposed in the same plane as the contacting surface of said object contacting device.

In testimony whereof I affix my signature.

AARON J. JACOBS.